(12) United States Patent
Schaible et al.

(10) Patent No.: US 8,220,491 B2
(45) Date of Patent: Jul. 17, 2012

(54) PIEZOELECTRIC VALVE

(75) Inventors: Jochen Schaible, Altensteig (DE); Marcus Grödl, Altdorf (DE)

(73) Assignee: Hoerbiger Automatisierungstechnik Holding GmbH, Altenstadt (DE)

( * ) Notice: Subject to any disclaimer, the term of this patent is extended or adjusted under 35 U.S.C. 154(b) by 269 days.

(21) Appl. No.: 12/690,298

(22) Filed: Jan. 20, 2010

(65) Prior Publication Data

US 2010/0117015 A1     May 13, 2010

Related U.S. Application Data

(63) Continuation of application No. PCT/EP2008/004008, filed on May 20, 2008.

(30) Foreign Application Priority Data

Jul. 20, 2007   (DE) .......................... 10 2007 034 048

(51) Int. Cl.
*F16K 31/02* (2006.01)
(52) U.S. Cl. .......... 137/625.65; 137/625.44; 251/129.06
(58) Field of Classification Search .................. 137/468, 137/625.44, 625.65, 504; 251/335.1, 129.06, 251/65; 335/234, 273
See application file for complete search history.

(56) References Cited

U.S. PATENT DOCUMENTS

| | | | |
|---|---|---|---|
| 3,909,308 A * | 9/1975 | Heagy | ............................... 438/85 |
| 4,340,083 A | 7/1982 | Cummins | |
| 4,567,394 A | 1/1986 | Frisch | |
| 4,617,952 A | 10/1986 | Fujiwara et al. | |
| 4,625,139 A | 11/1986 | Frisch | |
| 5,079,472 A | 1/1992 | Uhl et al. | |
| 5,343,894 A | 9/1994 | Frisch et al. | |
| 5,669,416 A | 9/1997 | Nusche | |
| 5,779,218 A | 7/1998 | Kowanz | |
| 6,125,877 A | 10/2000 | Ossenbruegge et al. | |
| 6,173,744 B1 | 1/2001 | Frisch et al. | |

FOREIGN PATENT DOCUMENTS

CA     2093257     10/1993
(Continued)

OTHER PUBLICATIONS

Translation of the International Preliminary Report on Patentability for corresponding International Application No. PCT/EP2008/004008 issued on Feb. 9, 2010.

(Continued)

*Primary Examiner* — Kevin Lee
*Assistant Examiner* — Macade Brown
(74) *Attorney, Agent, or Firm* — Myers Wolin, LLC

(57) ABSTRACT

A piezoelectric valve having a housing is provided with an inner chamber, in which ends at least one nozzle communicating with an associated port for a medium and provided with a sealing seat having a seat face, a deformable piezoelectric bending element being received in the inner chamber of the housing in such a way that the nozzle can be closed by a portion of the bending element movable relative to the nozzle in response to deformation of the bending element, and the bending element being provided with padding of an elastically resilient material, at least in its region opposite the nozzle. This sealing seat is disposed at the end face of a nozzle insert, which is disposed to be displaceable substantially perpendicular to the seat face in a receptacle fixed to the housing, a thermally expandable compensating member acting between the receptacle and the associated nozzle insert.

10 Claims, 2 Drawing Sheets

FOREIGN PATENT DOCUMENTS

| | | |
|---|---|---|
| DE | 2511752 | 10/1976 |
| DE | 3400645 | 7/1984 |
| DE | 3527069 | 2/1986 |
| DE | 4320909 | 6/1994 |
| DE | 4410153 | 2/1995 |
| DE | 19547149 | 6/1997 |
| EP | 0191011 | 6/1988 |
| EP | 0538236 | 4/1993 |
| EP | 0404082 | 1/1996 |
| EP | 0565510 | 2/1997 |
| EP | 0913609 | 5/1999 |
| EP | 0943812 | 9/1999 |
| EP | 0907852 | 7/2000 |
| WO | 97/09555 | 3/1997 |

OTHER PUBLICATIONS

International Search Report for corresponding International Application No. PCT/EP2008/004008 mailed Sep. 11, 2008.

* cited by examiner

PIEZOELECTRIC VALVE

CROSS REFERENCE TO RELATED APPLICATIONS

This application is a continuation of International Application PCT/EP2008/004008 filed May 20, 2008, and takes priority under 35 USC §119 from German Patent Application 10 2007 034 048.8 filed Jul. 20, 2007, the contents of each of which are incorporated herein by reference.

FIELD

The present invention relates to a piezoelectric valve having a housing, which is provided with an inner chamber through which a medium can flow, in which chamber there ends at least one nozzle communicating with an associated port for the fluidic medium and provided with a sealing seat having a seat face, a piezoelectric bending element that can be deformed by electrical energization being received in the inner chamber of the housing in such a way that the nozzle can be closed by a portion of the bending element movable relative to the nozzle in response to the deformation of the bending element, and the bending element being provided with padding of an elastically resilient material, at least in its region opposite the nozzle.

BACKGROUND

Piezoelectric valves are known in diverse configurations, for example from DE 2511752 A1, DE 3400645 A1, DE 3527069 A1, EP 0404082 B1, EP 0538236 A1, DE 4320909 C1, DE 4410153 C1, WO 97/09555 A1, DE 19547149 A1, EP 0191011 B1 and EP 0565510 B1. Piezoelectric valves belonging to the class in question and containing a piezoelectric bending element which, in view of the smallest possible leakage in closed position, is provided at least in the region opposite the nozzle with padding of an elastically resilient material, are described in particular in EP 0907852 B1 and EP 0943812 A1. According to EP 0907852 B1, the first of these citations, this padding of elastically resilient material is fashioned as an elastomeric disk attached locally to the bending element and made, for example, of fluorosilicone. According to EP 0943812 A1, there is applied on the freely movable region of the piezoelectric bending element located outside the clamping point an elastomeric coating, which is provided at the end face with a sealing bead, which ensures sealing of the inner chamber of the housing relative to the outside.

Compared with most other valves that can be activated electrically, piezoelectric valves are distinguished by particularly fast switching dynamics, which make this type of valve seem particularly suitable for a large number of applications. Nevertheless, the typical force-displacement characteristic of the bending transducer (in this regard, see in particular DE 4410153 C1) imposes certain limits on the application of piezoelectric valves, because the possible closing force decreases with increasing deflection. This typically limits the fluidic power that can be switched by the piezoelectric valve, which power is proportional to the product of flow to be switched and pressure gradient to be switched.

Accordingly, the object of the present patent application is to provide a piezoelectric valve of the type indicated hereinabove having increased fitness for practical use, with which valve higher switching powers can be achieved in practice than with known piezoelectric valves of the class in question, while still retaining or even improving the known advantages, such as the fast switching dynamics in particular.

SUMMARY

This object is achieved according to the present invention by the fact that, in a piezoelectric valve of the class in question, the sealing seat is disposed at the end face of a nozzle insert, which is disposed to be displaceable substantially perpendicular to the seat face in a receptacle fixed to the housing, a thermally expandable compensating member acting between the receptacle and the associated nozzle insert. A feature essential for the present invention is therefore that the sealing seat of the nozzle does not occupy an unchangeable or permanently set position relative to the housing, but that instead the position of the sealing seat relative to the housing can be changed by displacing a nozzle insert provided with the sealing seat at one of its end faces in a receptacle fixed to the housing. The position of the sealing seat relative to the housing then changes as a function of the dimensions of a thermally expandable compensating member, which acts in such a way between the receptacle fixed to the housing and the associated nozzle insert that it displaces the nozzle insert in the associated receptacle in a manner corresponding to its thermal expansion or contraction. The arrangement of the said thermally expandable compensating member is then such that, during expansion of the compensating member in response to thermal expansion, the nozzle insert is moved away from the bending element inside the receptacle fixed to the housing. In other words, during expansion of the compensating member in response to thermal expansion, the distance of the sealing seat disposed at the end face of the nozzle insert from the associated surface of the bending element becomes larger. In this way any thermal-expansion-induced swelling of the padding of elastomeric material disposed on the surface in question of the bending transducer is compensated in the sense that the distance maintained by the surface of the padding of elastomeric material in a particular switched condition of the valve to the seat face of the sealing seat remains substantially constant regardless of the operating temperature of the valve, or in any case changes significantly less than is the case in known piezoelectric valves of the class in question.

This results in several advantages that are decisive for practical use of piezoelectric valves. On the one hand, the safety margins, which in known piezoelectric valves of the class in question as regards their use at different operating temperatures (typical operating range: −30 to +80° C.; expanded operating range: −50 to +100° C.), can be dispensed with or at least considerably reduced, thus having great advantages in particular for applications in the expanded temperature range. Consequently, it is possible on the one hand to configure inventive piezoelectric valves that operate specifically at low operating temperatures with a smaller unproductive travel than known valves of the class in question, and also such piezoelectric valves whose fluidic power is not influenced at all by temperature or is less influenced than in the prior art. This is advantageous not only for the switching dynamics. Considering the typical force-displacement characteristics of piezoelectric bending elements, it is therefore also possible, by application of the present invention, to switch higher fluidic powers as a consequence of reduced unproductive travels. Furthermore, the operating characteristic of the inventive piezoelectric valve has better reproducibility over a larger temperature range than is the case for known valves of the class in question. This substantially expands the potential uses of piezoelectric valves in areas in which particularly good reproducibility of the switching behavior of the valve is necessary. Also, the inventive piezoelectric valve can be used safely for operation in a broader temperature range than is possible according to the prior art, in turn expanding the potential uses of the piezoelectric valves having switching dynamics superior to those of other electrically actuated valves into the range of higher temperatures in particular.

To achieve particularly beneficial use of the effects explained in the foregoing, it is advantageous for the compensating member to have substantially the same thermal expansion behavior as the padding of the bending element, especially by making the compensating element and the padding of the bending element from the same or closely related materials and giving them the same or substantially the same effective thickness. However, this is not imperative, since, for example, the described advantages can also be achieved with different material pairs for compensating member and padding, for example by making the compensating member thicker than the padding of the bending element, but of a material that has a smaller coefficient of thermal expansion than does the material of the padding. Subject to certain prerequisites, such material pairs may even prove to be particularly advantageous, for example as regards joining the two corresponding surfaces of the compensating member reliably with the receptacle fixed to the housing and with the nozzle insert, whereby a separate spring element (see below) urging the nozzle insert against the compensating member becomes superfluous.

Particularly preferably, the compensating member is made with annular shape and is disposed between a flange of the nozzle insert and a shoulder of the receptacle. In this connection, it is in no way imperative to understand "annular" as circular; instead, the annularly closed compensating member may assume any desired geometric shape closed in itself. The displacement forces necessary to change the position of the nozzle insert can be reliably provided with such an annular compensating member even in the case of particularly compact valves, the transmission of the displacement forces into the nozzle insert in a manner symmetric to the axis of the nozzle insert then being favorable for the functional reliability.

The present invention can be implemented both in valves in which the receptacle for the nozzle insert is molded directly in the housing and in valves in which the receptacle for the nozzle insert is constructed in a separate nozzle carrier inserted into the housing. The second of the cited embodiments is favorable inasmuch as its additional geometric degree of freedom permits adjustment of the nozzle in order to fix a desired operating characteristic, especially by the fact that the nozzle carrier can be screwed via a precision thread into the housing or can be pressed to a selectable depth therein.

It was already mentioned hereinabove that the nozzle insert can be urged by means of a spring element against the compensating member. For this purpose, such a spring can be braced in particular against the receptacle fixed to the housing for the nozzle insert and can be made in various constructions. It is possible to dispense with a corresponding separate spring element if the compensating member is joined to the nozzle insert as well as to the associated receptacle in a manner suitable for transmission of pulling forces, such as by adhesive bonding, vulcanization or the like. Such a joint additionally has the advantage that a gastight joint of the corresponding parts with one another can be ensured.

The present invention can be used with the advantages explained in the foregoing both in valves having only one nozzle and in valves provided with nozzles, which are disposed substantially opposite one another, and which can be closed selectively by deforming the bending element by electrical energization, as is employed, for example, in 3/2-way seat valves. The particularly high precision and reproducibility of the operating characteristic of the inventive valves over a broad temperature range permits entirely new applications precisely for 3/2-way valves. The advantages of the invention are particularly evident in proportionally operating pneumatic actuators or controllers, in which the bending element, when used as intended, not only can be switched into its end position closing both or respectively one of the two nozzles but instead can occupy any desired intermediate positions between the two nozzles in order—by changing the flow resistance—to control the flow through them in a different ratio relative to one another. Accordingly, it is only the use of the present invention that makes it possible to obtain piezoelectrically operated fluidic switches satisfying the stringent requirements of operating accuracy and reproducibility, especially under temperature influences. Depending on which position the bending element of the corresponding proportionally operating switch valve is to occupy at its electrically de-energized operating point, one or two restoring springs may act on the bending element, each of which springs is braced against a buttress fixed to the housing and urges the bending element into its predetermined position for currentless operation, or which acts in a manner that reduces hysteresis effects and assists resetting of the bending element when the electrical energization ends.

BRIEF DESCRIPTION OF THE DRAWINGS

The present invention will be explained in more detail hereinafter on the basis of two preferred exemplary embodiments illustrated in the drawing, wherein.

DETAILED DESCRIPTION

Figure 1:
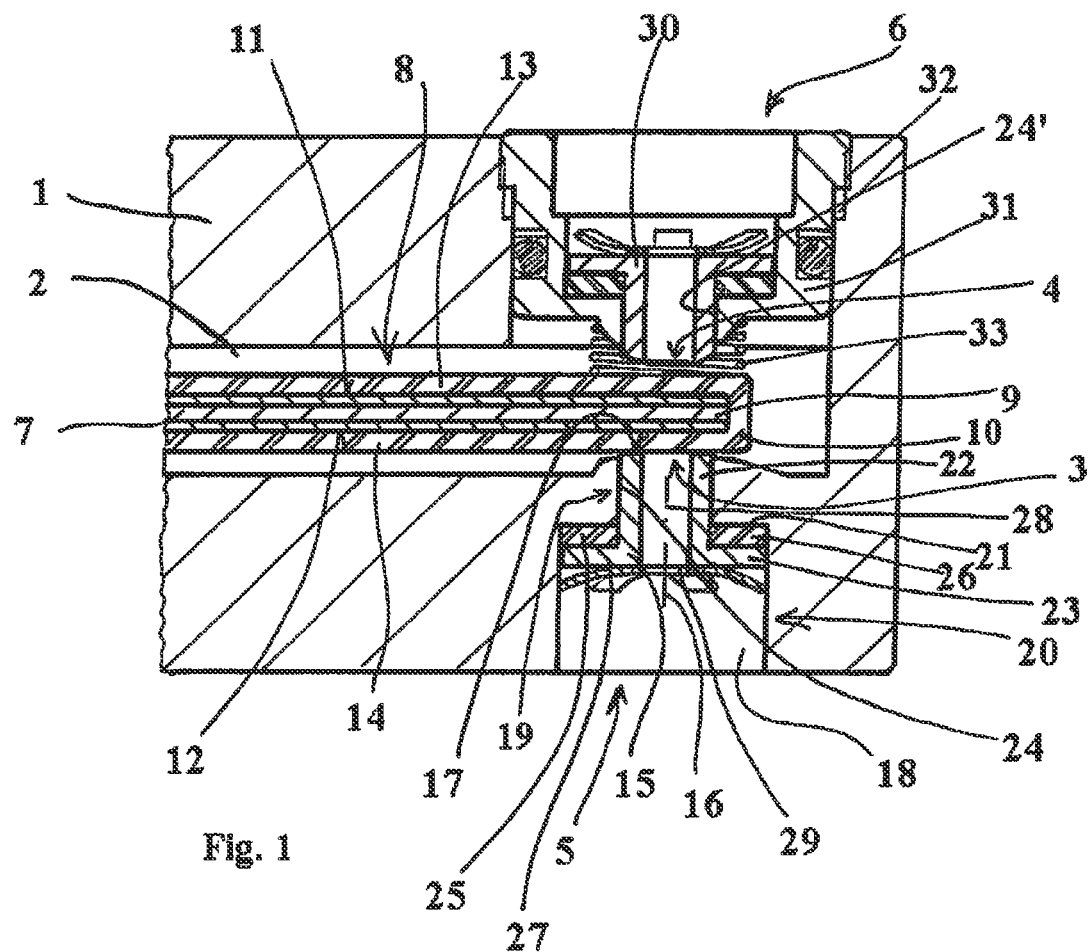
FIG. 1 shows a longitudinal section through the region, which alone is of interest here, of the end of the nozzle in a first inventive piezoelectric valve, which, in its non-illustrated region, is designed according to the prior art.

As regards its basic construction, the valve according to the preferred embodiment reproduced in FIG. 1 of the drawing corresponds to the valve known from EP 943812 A1 (U.S. Pat. No. 6,143,744 B1). A comprehensive description of all details and other design features of the illustrated valve will therefore be dispensed with, and instead, to supplement the explanation hereinafter, the cited publication is referred to in its entirety.

The piezoelectric valve illustrated in FIG. 1 of the drawing comprises a housing 1, which is provided with an inner chamber 2 through which medium can flow. In inner chamber 2 there end two oppositely disposed nozzles 3 and 4, each of which communicates with an associated port 5 and 6 respectively for the fluidic medium. Also ending in known manner in inner chamber 2 of housing 1 is an opening (not illustrated). In inner chamber 2 of housing 1 there is received a piezoelectric bending element 7, which is deformable by electrical energization, in such a way that region 8 of the bending element, which changes its position relative to the housing during its electrical energization, projects with its end portion 9 between the two nozzles 3 and 4. Depending on the electrical energization, bending element 7 is therefore able to close first nozzle 3 or second nozzle 4 or else occupy any desired intermediate positions, in which both nozzles are more or less wide open.

In cantilever region 8 overhanging beyond its clamping point, there is placed on bending element 7 a coating 10 made of elastically resilient, elastomeric material, which forms paddings 13 and 14 respectively on upper side 11 and lower side 12 of bending element 7.

Nozzle 3 illustrated at the bottom of FIG. 1 of the drawing comprises a nozzle insert 15, whose end face proximal to inner chamber 2 of the housing forms a seat face 17 disposed substantially perpendicular to axis 16 of nozzle 3. To receive nozzle insert 15, housing 1 is provided with a stepped bore 18, whose region 19 of smaller bore diameter is disposed adjacent to inner chamber 2 of the housing and whose region 20 of larger bore diameter is disposed adjacent to the outside of housing 1. The two regions 19 and 20 of stepped bore 18 provided with different bore diameters are separated from one another by a shoulder 21. Nozzle insert 15 is provided with a tubular portion 22 and a flange 23 disposed on the end face thereof. It is guided displaceably in housing 1 in a manner substantially perpendicular to seat face 17. For this purpose tubular portion 22 of nozzle insert 15 is received slidingly along axis 16 in region 19 of stepped bore 18 provided with the smaller bore diameter and in this respect forming a receptacle 24 for the nozzle insert.

Between shoulder 21 of stepped bore 18 and flange 23 of nozzle insert 15 there is disposed a thermally expandable compensating member 25 in the form of an elastomeric ring 26. The nozzle insert is urged against elastomeric ring 26 by means of a spring 27, which is braced on the wall of region 20 of stepped bore 18 provided with the larger bore diameter and which is provided with a bore 29 corresponding to bore 28 of nozzle insert 15. Elastomeric ring 26 is made of the same material as coating 10 of bending element 7, and is provided with a thickness that corresponds to the thickness of coating 10 in the region disposed opposite nozzle 3. In this way, if the operating temperature of the valve rises, nozzle insert 15 is moved backward, or in other words is moved away from bending element 7, by the same amount as coating 10 becomes thermally expanded. Thus the closed position of the bending transducer remains constant despite the temperature-dependent change of thickness of coating 10. The same is true, in the case that nozzle 3 is open, for the distance of the surface of padding 14 from seat face 17 in a given position of bending element 7.

The foregoing explanations apply correspondingly for nozzle 4 illustrated at the top of FIG. 1 of the drawing, except that the corresponding nozzle insert 30 is not displaceably guided directly in a bore of housing 1 but instead is guided in the bore, which again is constructed as a stepped bore, of a nozzle carrier 31. Accordingly, receptacle 24 for nozzle insert 30 is formed by the stepped bore of nozzle carrier 31. Nozzle carrier 31 is screwed into housing 1 via a threaded joint 32. Thus the position of nozzle carrier 31 can be fixed for the purpose of adjusting the switching or operating characteristic of the valve.

Also illustrated in FIG. 1 is restoring spring 33, which urges bending element 7 against nozzle 3 in such a way that, in the absence of electrical energization of the bending element, nozzle 3 is reliably closed, by the fact that coating 10 of the bending element bears sealingly thereon.

Figure 2:
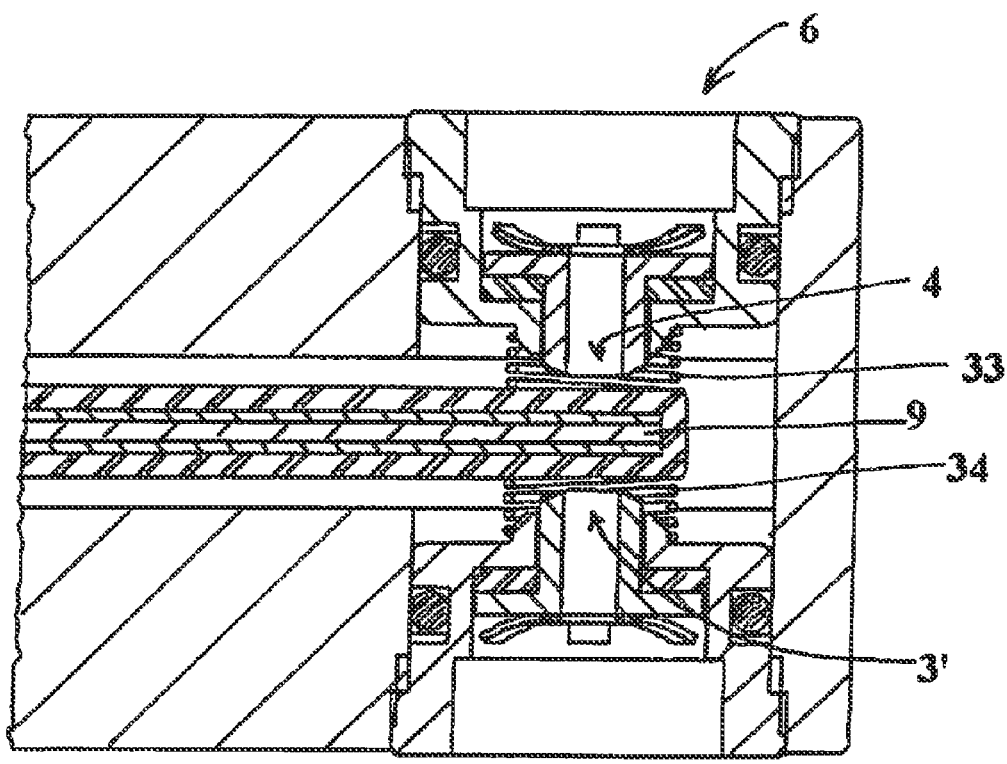
FIG. 2 shows a longitudinal section through the region, which alone is of interest here, of the end of the nozzle in a second inventive piezoelectric valve, which, in its non-illustrated region, is also designed according to the prior art.

The piezoelectric valve illustrated in FIG. 2 of the drawing differs from that according to FIG. 1 only by two features. On the one hand, both nozzles 3' and 4 are constructed in the same way as described in the foregoing with reference to nozzle 4 of the valve according to FIG. 1, and so both nozzles 3' and 4 can be fixed in the described manner. Also provided are two restoring springs 33 and 34 disposed in mirror-image positions and acting in opposition to one another on bending element 7, so that, in the absence of electrical energization, this reliably occupies a middle position disposed between the seat faces of the two nozzles 3' and 4. In this way the valve according to FIG. 2 is particularly suitable for use as a proportionally operating actuator.

What is claimed is:

1. A piezoelectric valve comprising:
   a housing provided with an inner chamber through which a medium can flow, in which chamber there ends at least one nozzle communicating with an associated port for the medium and provided with a sealing seat having a seat face, and
   a piezoelectric bending element that is deformed by electrical energization being received in the inner chamber of the housing in such a way that the at least one nozzle can be closed by a portion of the bending element that is movable relative to the at least one nozzle in response to deformation of the bending element, the piezoelectric bending element being provided with padding of an elastically resilient material at least in a region opposite the at least one nozzle,
   wherein the sealing seat is disposed at an end face of a nozzle insert that is disposed to be displaceable substantially perpendicular to the seat face in a receptacle fixed to the housing,
   wherein a thermally expandable compensating member acts between the receptacle and the nozzle insert, and
   wherein the nozzle insert is urged by a spring element against the compensating member.

2. A piezoelectric valve according to claim 1, wherein the compensating member is annularly shaped and is disposed between a flange of the nozzle insert and a shoulder of the receptacle.

3. A piezoelectric valve according to claim 1, wherein the compensating member exhibits substantially the same thermal expansion behavior as the padding of the bending element.

4. A piezoelectric valve according to claim 3, wherein a thicknesses of the compensating member and the padding correspond substantially to one another.

5. A piezoelectric valve according to claim 1, wherein the receptacle is a nozzle carrier inserted into the housing.

6. A piezoelectric valve according to claim 1, wherein the compensating member is joined to the nozzle insert as well as to the receptacle in a manner suitable for transmission of pulling forces.

7. A piezoelectric valve according to claim 1, further comprising two nozzles, which are disposed substantially opposite one another, and which can be closed selectively by deforming the bending element by electrical energization.

8. A piezoelectric valve according to claim 7, further comprising a restoring spring, braced against a buttress fixed to the housing and urging the bending element against one of the two nozzles, that acts on the bending element in a region of its portion intended for closing the two nozzles.

9. A piezoelectric valve according to claim 7, further comprising two restoring springs, directed in opposition to one another, urging the bending element into a middle position disposed between the two nozzles and each braced against a buttress fixed to the housing, that act on the bending element in a region of its portion intended for closing the two nozzles.

10. A piezoelectric valve according to claim 7, wherein the respective sealing seat of both nozzles is disposed at the end face of the nozzle insert, which is disposed to be displaceable substantially perpendicular to the seat face in the receptacle fixed to the housing, the thermally expandable compensating member acting between the respective receptacle and the associated nozzle insert.

* * * * *